United States Patent Office 3,027,295
Patented Mar. 27, 1962

3,027,295
PAPER OF IMPROVED DIMENSIONAL STABILITY
Donald K. Pattilloch, New York, N.Y., assignor to Michigan Research Laboratories, Inc., Long Island City, N.Y., a corporation of Michigan, and Electro-Chem Fiber Seal Corporation, New York, N.Y., a corporation of Delaware, jointly
No Drawing. Filed Aug. 5, 1960, Ser. No. 47,599
7 Claims. (Cl. 162—169)

This invention relates to paper of high dimensional stability and processes for the preparation thereof.

It is among the objects of this invention to prepare paper which is relatively insensitive to atmospheric moisture changes insofar as dimensions of the paper are concerned. The need for such paper has long been felt, particularly for maps, navigation charts, recording charts and other applications. As can be appreciated, maps or charts which change dimensions with humidity changes are a source of error in computations which depend on the measurement of distances and angles between indicia on such paper charts or maps.

It is also an object of the invention to prepare dimensionally stable paper which has exceptionally high bursting and tensile strength in both wet and dry states.

The United States Government has specified the following criteria for military map paper:

Maximum hygro-expansivity in machine direction _____ 0.075%.
Maximum hygro-expansivity in transverse direction _____ 0.250%.
Bursting strength, dry _____ 50 p.s.i.
Bursting strength, wet _____ 20 p.s.i.
Tensile strength in machine direction _____ 11 kg./15 mm. width.
Tensile strength in transverse direction _____ 6 kg./15 mm. width.

Hygro-expansivity is defined as the percent expansion or contraction for a 15% relative humidity change at 70° F.

Very few of the prior art papers produced for military maps have been able to meet the above specifications. The best papers available show expansivity in the machine direction of 0.063% and 0.151% in the transverse direction. By contrast, paper of the present invention can be consistently produced which has maximum expansivity of 0.025% in the machine direction and 0.082% in the transverse direction.

The paper of the invention is produced by reacting cellulose fibers while suspended in an aqueous medium with polymerized ethylene imine, reacting the resulting suspension with a rosin ammonia complex, and forming the suspension into a sheet. The process preferably involves the addition of a wet-strength resin, such as urea-formaldehyde or melamine formaldehyde, and also the usual paper fillers, such as titanium dioxide.

A simplified flow diagram of a process of this invention is as follows:

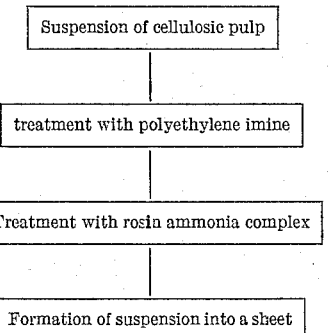

Polymerized ethylene imine, or polyethyleneimine, has a molecular weight of about 30,000 to 40,000 and has the formula

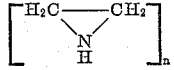

where $n$ is about 700 to 800. It reacts with the hydroxyl or carboxyl groups of cellulose, presumably with ring opening, and the reactive amino groups then apparently react with the rosin-ammonia complex to chemically link the same to the cellulose.

The rosin-ammonia complex is prepared by refluxing rosin with ammonia in alcoholic media. The ammonia reacts with some of the free carboxylic groups of the rosin to yield amide groups. The complex used in the examples set forth herein is prepared by refluxing 4 parts of rosin with 3 parts of 26° Bé. ammonia in methanol for 6 hours. It is available as a 60% solution in alcohol, and is added as a 10% suspension obtained by diluting the alcoholic solution with water.

Example I

A 2.75% consistency bleached high alpha cellulose pulp was charged to a beater. The Canadian Standard freeness was 717. The stock was beaten for 5 minutes with the beater roll clearance at 0.10 inch. The roll clearance was then adjusted to 0.03 inch and beating continued for 15 minutes. Thereafter, the roll clearance was adjusted to 0.02 inch and beating continued for 45 minutes. The freeness of the pulp at this point was 708.

Beating was then continued as 2% by weight of the dry weight of the pulp of polyethyleneimine (in the form of a 10% aqueous solution) was added. After one hour of beating, the Canadian Standard freeness was 685. A 10% aqueous solution containing 3% by weight of the dry weight of the pulp of cationically reactive monoethanolamine-modified urea formaldehyde resin was then added. (The resin is prepared by reacting 1 mol urea, 2 mols formaldehyde and 0.1 mol monoethanolamine.)

Then 3% by weight (dry basis) of titanium dioxide filler was added in the form of a 10% aqueous slurry. After 10 minutes, 2% by weight of the dry pulp of rosin-ammonia complex, as a 10% suspension defined above, was added and then an aqueous solution containing 1.3% by weight (dry basis) of basic aluminum formate added.

The pulp suspension was then fed to the head box of a Fourdrinier machine. The pH at the head box was 4.9.

The machine speed was 27 feet/minute. The shrinkage at the drier was ⅜ inch on a 19½ inch deckle. The resulting 24 lb. sheets exhibited the following properties:

Hygro-expansivity in machine direction 0.025%.
Hygro-expansivity in transverse direction 0.082%.
Wet strength _____ 40%.
Bursting strength _____ 64 p.s.i.
Schopper fold strength _____ 1730 (machine direction).
Schopper fold strength _____ 1276 (across).

*Example II*

Pulp was initially prepared by the method of Example I, 2% by weight of polyethyleneimine and thereafter 3% by weight of cationic monoethanolamine-modified urea formaldehyde resin were added as in Example I. Thereafter, a suspension containing by weight (dry basis) 3% rosin ammonia complex and 3% titanium dioxide was added. Beating was continued for 10 minutes and alum was added to give a pH of 4.7. The resulting 24 lb. sheets produced on a 19½ inch Fourdrinier machine at 29.4 feet/minute exhibited the following expansivity:

Percent
Hygro-expansivity, machine direction _____ 0.057
Hygro-expansivity, transverse direction _____ 0.126

*Example III*

Bleached hardwood pulp of 4% consistency was initially prepared as in Example I. Then 0.75% by weight of polyethyleneimine (dry basis on dry weight of the pulp) was added in the form of a 5% aqueous solution and beating continued for 30 minutes. Thereafter 3% monoethanolamine-modified resin, subsequently 10% aluminum formate and finally 2% rosin ammonia complex were added as in Example I.

The pulp was delivered to the headbox of a Fourdrinier machine. The finished paper exhibited the following properties:

Percent
Hygro-expansivity, machine direction _____ 0.060
Hygro-expansivity, transverse direction _____ 0.165

*Example IV*

Pulp (25% bleached softwood kraft, 75% bleached hardwood kraft) was prepared as in Example I and subsequently beaten with the following, in sequential order as in Example I:

1% polyethyleneimine
1% Polymekon wax (high melting point microcrystalline petroleum wax dispersed in 30% isopropanol, 70% water)
4% aluminum formate
(Percentages are dry weight based on dry weight of pulp.)

The pulp was then adjusted to pH 4.25 with glycolic acid and delivered to the headbox of an 84 inch Fourdrinier machine. The shrinkage on the machine was 2½ inches. The paper had the following properties:

Percent
Hygro-expansivity, machine direction _____ 0.066
Hygro-expansivity, transverse direction _____ 0.163

*Example V*

Pulp (100% bleached hardwood kraft) was prepared as in Example I and the following added, in sequential order as in Example I:

0.75% polyethylene imine
3% urea-formaldehyde resin
10% aluminum formate
2% rosin-ammonia complex
(Percentages are on dry basis by weight of dry pulp.)

The pulp was delivered to the headbox of an 84 inch Fourdrinier machine. The shrinkage was 1.75 inches on an 84 inch deckle. The paper exhibited the following properties:

Percent
Hygro-expansivity, machine direction _____ 0.066
Hygro-expansivity, transverse direction _____ 0.139

*Example VI*

Pulp (100% bleached kraft) was delivered to a conventional hydropulper-hydrafiner-Norden hydracycling tank circuit system and the following added in sequential order to the hydracycling tank:

2% polyethyleneimine
3% monoethanolamine - modified urea - formaldehyde resin
3% rosin ammonia complex The pH was then adjusted to pH 4.8 by the addition of alum to the hydracycling tank. The Canadian Standard freeness of the treated pulp was 620.

Paper prepared from the above pulp on a conventional Fourdrinier machine exceeded the U.S. Government specifications for map paper.

The improved papers of the invention are thus prepared by conventional paper-making techniques using conventional machinery of the Fourdrinier or other type. The customary drying temperatures are employed. Any high grade pulp can be used in the process.

The alum or other aluminum salt is employed to reduce the pH to a point at which the resin cures at the comparatively low paper-drying temperatures. Other acids or acidic salts may be used with equivalent results. The term acid is intended to cover both acids per se and acidic salts.

While the invention has been described in terms of certain examples, such examples are to be considered illustrative rather than limiting, and it is intended to cover all modifications and embodiments that fall within the spirit and scope of the appended claims.

What is claimed is:

1. The process of producing dimensionally stable paper comprising treating an aqueous suspension of cellulosic pulp with 0.75 to 2% of polyethylene imine, reacting the suspension with 2 to 3% of rosin ammonia complex, and forming the suspension into a sheet, said percentages being based on the dry weight of pulp.

2. The process of producing high wet strength, dimensionally stable paper comprising treating an aqueous suspension of cellulosic pulp with 0.75 to 2% of polyethylene imine, treating the suspension with 1 to 3% of a heat curable aminoplast wet-strength resin, treating the suspension with 2 to 3% of rosin ammonia complex, forming the resulting suspension into a sheet, and curing the resin, said percentages being based on the dry weight of pulp.

3. The process set forth in claim 2 wherein said aminoplast resin is urea-formaldehyde resin.

4. The process set forth in claim 2 wherein said aminoplast resin is monoethanolamine-modified urea-formaldehyde resin.

5. The process set forth in claim 2 wherein said pH is reduced to catalyze the curing of said resin by the addition of an acid.

6. The process set forth in claim 5 wherein said acid is alum.

7. The process set forth in claim 5 wherein said acid is aluminum formate.

References Cited in the file of this patent

UNITED STATES PATENTS

| | | |
|---|---|---|
| 2,694,633 | Pattilloch | Nov. 16, 1954 |
| 2,698,793 | Landes | Jan. 4, 1955 |
| 2,772,966 | Daniel | Dec. 4, 1956 |
| 2,957,796 | Pattilloch | Oct. 25, 1960 |

FOREIGN PATENTS

| | | |
|---|---|---|
| 154,799 | Australia | Jan. 19, 1954 |